US011331243B2

(12) United States Patent
Sechrest

(10) Patent No.: US 11,331,243 B2
(45) Date of Patent: May 17, 2022

(54) UPRIGHT MASSAGE TUB THAT CONVERTS INTO A STANDARD BATHTUB

(71) Applicant: Robert J. Sechrest, Archdale, NC (US)

(72) Inventor: Robert J. Sechrest, Archdale, NC (US)

(*) Notice: Subject to any disclaimer, the term of this patent is extended or adjusted under 35 U.S.C. 154(b) by 0 days.

(21) Appl. No.: 17/139,977

(22) Filed: Dec. 31, 2020

(65) Prior Publication Data

US 2022/0062092 A1    Mar. 3, 2022

Related U.S. Application Data

(60) Provisional application No. 62/955,602, filed on Dec. 31, 2019.

(51) Int. Cl.
*A47K 3/12* (2006.01)
*A61H 9/00* (2006.01)
*A01K 13/00* (2006.01)

(52) U.S. Cl.
CPC ......... *A61H 9/0021* (2013.01); *A01K 13/001* (2013.01); *A47K 3/127* (2013.01); *A61H 2009/0035* (2013.01); *A61H 2201/1635* (2013.01); *A61H 2203/0431* (2013.01)

(58) Field of Classification Search
CPC .......... A61H 9/0021; A61H 2009/0035; A61H 2009/0042; A47K 3/122; A47K 3/125; A47K 3/127
USPC .......................................................... 4/541.3
See application file for complete search history.

(56) References Cited

U.S. PATENT DOCUMENTS

| 546,654 | A | | 9/1895 | Coffin |
| 3,936,891 | A | | 2/1976 | Kulde |
| 4,446,586 | A | | 5/1984 | Reed et al. |
| 4,592,099 | A | | 6/1986 | Zellner |
| 4,596,241 | A | | 6/1986 | Neudorfer |
| 5,077,841 | A | | 1/1992 | Sugai |
| 5,329,651 | A | * | 7/1994 | Mardero ................ A47K 3/003 4/561.1 |
| 6,572,570 | B1 | | 6/2003 | Burns et al. |
| 6,708,961 | B2 | | 3/2004 | Ferber et al. |
| 7,472,432 | B2 | | 1/2009 | Owen |
| 8,561,223 | B2 | | 10/2013 | Sato et al. |
| 10,506,899 | B2 | | 12/2019 | Szutkowski |
| 2006/0265803 | A1 | | 11/2006 | Brunelle et al. |
| 2008/0178380 | A1 | * | 7/2008 | Rydalch ................. A47K 3/022 4/555 |
| 2008/0276363 | A1 | | 11/2008 | Chen |
| 2013/0000033 | A1 | | 1/2013 | Gilleran |
| 2013/0263371 | A1 | * | 10/2013 | Qian ........................ A47K 3/02 4/584 |
| 2014/0338115 | A1 | | 11/2014 | Sadler |
| 2016/0271012 | A1 | * | 9/2016 | Xu ..................... A61H 33/6094 |

(Continued)

*Primary Examiner* — Huyen D Le
(74) *Attorney, Agent, or Firm* — James G. Passé; Passé Intellectual Property, LLC

(57) ABSTRACT

An upright massage tub can be converted into a standard bathtub. The upright massage tub is designed so as users can safely and easily enter the tub in a step/sit motion, sitting themselves upright in a natural, ergonomic position (at approximately a standard chair height). This upright design is also better for user assistants, putting them in a better ergonomic position while they assist users in bathing. This upright massage tub design also includes a vertically adjustable hub, housing a water jet that can deliver a proximity source of water-jet flow.

1 Claim, 5 Drawing Sheets

(56) References Cited

U.S. PATENT DOCUMENTS

2018/0192829 A1 7/2018 Manchiraju
2022/0062092 A1 3/2022 Sechrest

* cited by examiner

UPRIGHT MASSAGE TUB THAT CONVERTS INTO A STANDARD BATHTUB

BACKGROUND OF THE INVENTION

Traditional bathtubs and traditional water-jet style massage tubs do not offer good ergonomic design for users entering/exiting the tub, or for user assistants in helping users enter/exit the tub. Also, these traditional designs do not offer users a full body, therapeutic massage experience including a user's frontal upper body, frontal thighs, and stomach. The newer walk-in style tubs do make entering and exiting the tub easier, but they do not offer users a full body, therapeutic massage experience, and they are not designed for bathing children or pets.

DISCLOSURE OF INVENTION

Present invention is a step/sit design of massage tub, with the seat height approximating a standard chair seat height. This step/sit design allows for available space above the user for a heated water tank, and a multi-functional adjustable hub. The heated water tank will provide the tub a Quick-Fill feature that will deliver the stored water to the tub in a rapid release of water volume, filling the tub for use without delay. The adjustable hub innovation provides users frontal massage capability as well as the ability to convert the upright massage tub into a standard bathtub for bathing children and/or pets.

The adjustable hub operates on a vertical rail that is located on the back wall of the tub, and which has four adjustable Positions. Position 1 is where the hub is at the top of the rail, out of the way of a user entering or exiting the tub. Position 2 is where the hub is lowered from Position 1 into a position where its housed water jet can deliver a proximity source of water-jet flow for massaging a user's frontal upper-body. Position 3 is where the hub is lowered from Position 2 into a position where its housed water jet can deliver a proximity source of water-jet flow for a therapeutic massage of user's frontal thighs and stomach. Position 4 is where the hub is lowered into its lowest position, where the right side of the hub meets the front edge of the seat, sealing-off the leg compartment of the tub. The hub top can then be unfolded to cover the seat, thereby converting the tub into a traditional shaped bathtub for bathing children and pets—but at a superior ergonomic height.

BRIEF DESCRIPTION OF DRAWINGS

Additional characteristics of the advantages of the disclosed invention are further revealed by accompanying drawings wherein.

DRAWINGS REFERENCE NUMERALS

Figure 1:
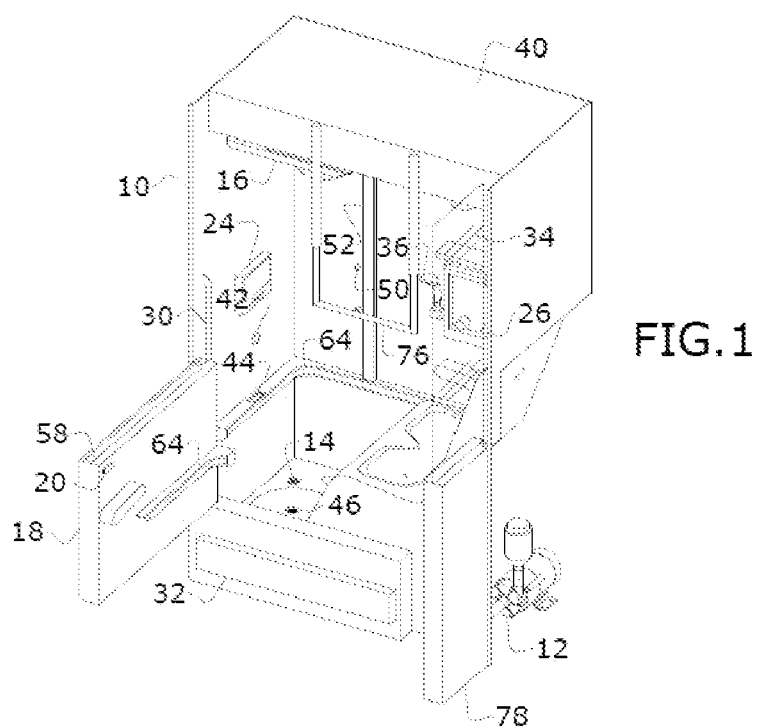
FIG. 1: is a perspective view of the invention

10: is the tub
12: is the heated air jet motor
14: are the water jets
16: is the height adjustable hub/plug
18: is the pair of opening watertight doors
20: is the lock
22: are the adjustment dials
24: is the control panel
26: are the water valve knobs
28: is the faucet
30: is the safety handle
32: is the step
34: is the glass panel
36: is a hand-held shower head
38: is a stationary shower head
40: is the heated water tank
42: is the lower drain control
44: is the upper-level drain with plug
46: is the lower-level drain
48: are the seat drain holes
50: are the air jet water ports
52: is the hub/plug support guide
54: is the adjustable hub top that unfolds to become leveling seat cover
56: is the anti-slip surface
58: is the safety screen
60: is the shelf
62: is the sealing lip
64: is the sealing ledge
66: is the door hinge rod
68: is the lower level Quick-Fill faucet
70: is the user
72: is the canine
74: is the upper tub frame structure
76: is the telescoping handle

DETAIL DESCRIPTION

Reference to FIG. 1 illustrates a perspective view of the preferred embodiment of the present invention. The hydro-massaging/bathing apparatus consists of a tub 10, made of fiberglass, having a height of no more than eight feet, with the top one foot of the apparatus consisting of a heated water tank 40. Opening to the left and the right side of the tub apparatus is a pair of opening watertight doors 18 that have a lock 20 on the upper interior the left door, that locks the doors to each other as well as the frame of the tub apparatus. On the inside of the left door 18 there is a sealing ledge 64 that connects with the tub in two places when the tub doors 18 are closed. The left side of the sealing ledge 64 connects with the sealing ledge 64 located opposite of the seat, while the right side of the tub door's sealing ledge 64 connects with the tub seat. This allows for the sealing-off of the lower compartment (leg area) of the tub by the height adjustable hub/plug 16 shown in FIG. 2, as part of the process of converting the upright tub into a standard shaped bathtub for bathing children and/or pets. Located on the tub sealing ledge 64 opposite of the seat, there is the upper-level tub drain 44, to be opened and closed manually with a plug. Also located on the opposite wall of the seat, above the upper-level tub drain 44, there is a lower-drain control 42 that controls the opening and closing of the lower drain 46 located at the bottom and in the middle of the lower tub. On each side of this drain 46, there is a water jet 14, for massaging the user's feet and legs. There is also a water jet 14 on the height adjustable hub/plug 16 shown in FIG. 2, that delivers a frontal massage for the user, with water jets 14 also located on the right wall of the upper tub for delivering massage to the user's upper and lower back.

Figure 2:
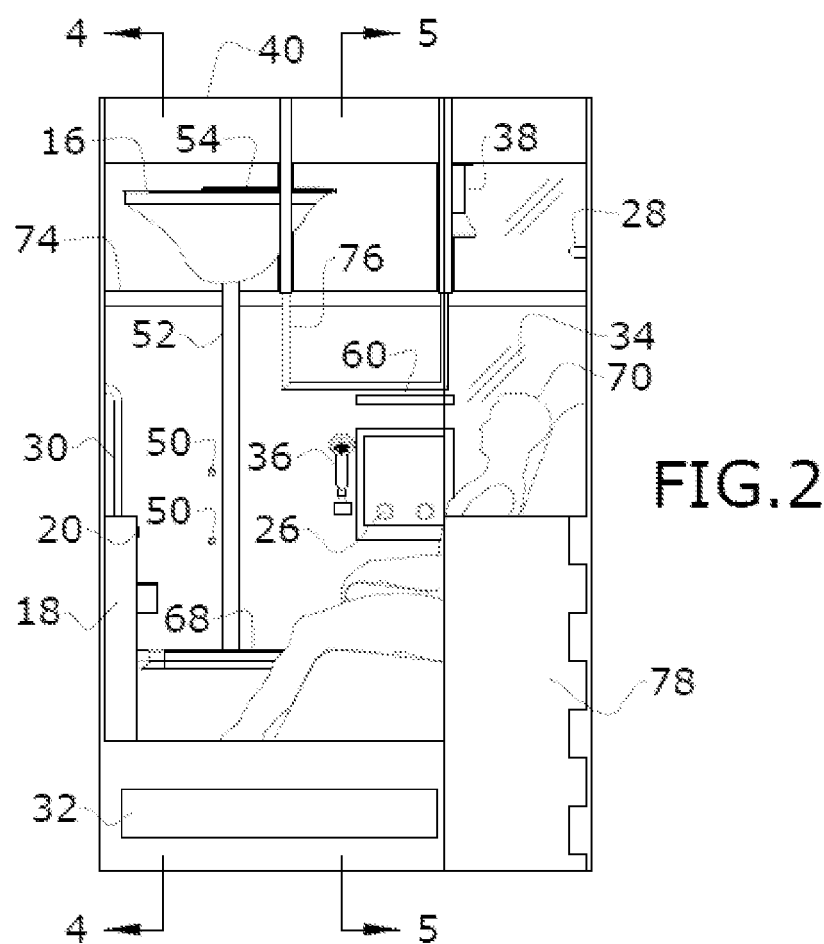
FIG. 2: is a front view of the invention shown in-use with the door open

Reference to FIG. 2 illustrates the tub's frontal aspect. The height adjustable hub/plug 16 is attached to the vertical hub/plug support guide 52 located on the back wall. As part of the process for converting the upright massage tub into a standard shaped bathtub for bathing children and/or pets, when the height adjustable hub/plug 16 is in its lowest position down the vertical hub/plug support guide 52, the hub top is the adjustable hub top that unfolds to become leveling seat cover 54. At the bottom of the tub on the back wall, there is a lower level Quick-Fill faucet 68 that allows for a rapid water release from the heated water tank 40 to the lower tub. On the wall opposite the seat, is safety handle 30 which allows for safe user entry and exit of the tub. On the right tub door, resting on the apparatus tub frame and extending vertically to the heated water tank 40 is the shower-glass panel 34 which keeps water from splashing out of the tub. The user 70 is sitting in the seat behind this glass panel. Above the user 70 is the upper tub frame structure 74 that frames-out the front facing section of the heated water tank 40 and the height adjustable hub/plug 16. The upper tub frame structure 74 has an upper and lower horizontal support rail, as well as two vertical support rails that divide the upper tub frame structure 74 into three evenly spaces rectangle sections that will be filled with panes of shower glass. These two vertical support rails are designed in such way that they will house the telescoping handle 76 that can be easily lowered and raised as needed, into a position that helps the user safely enter and exit the tub.

Figure 3:
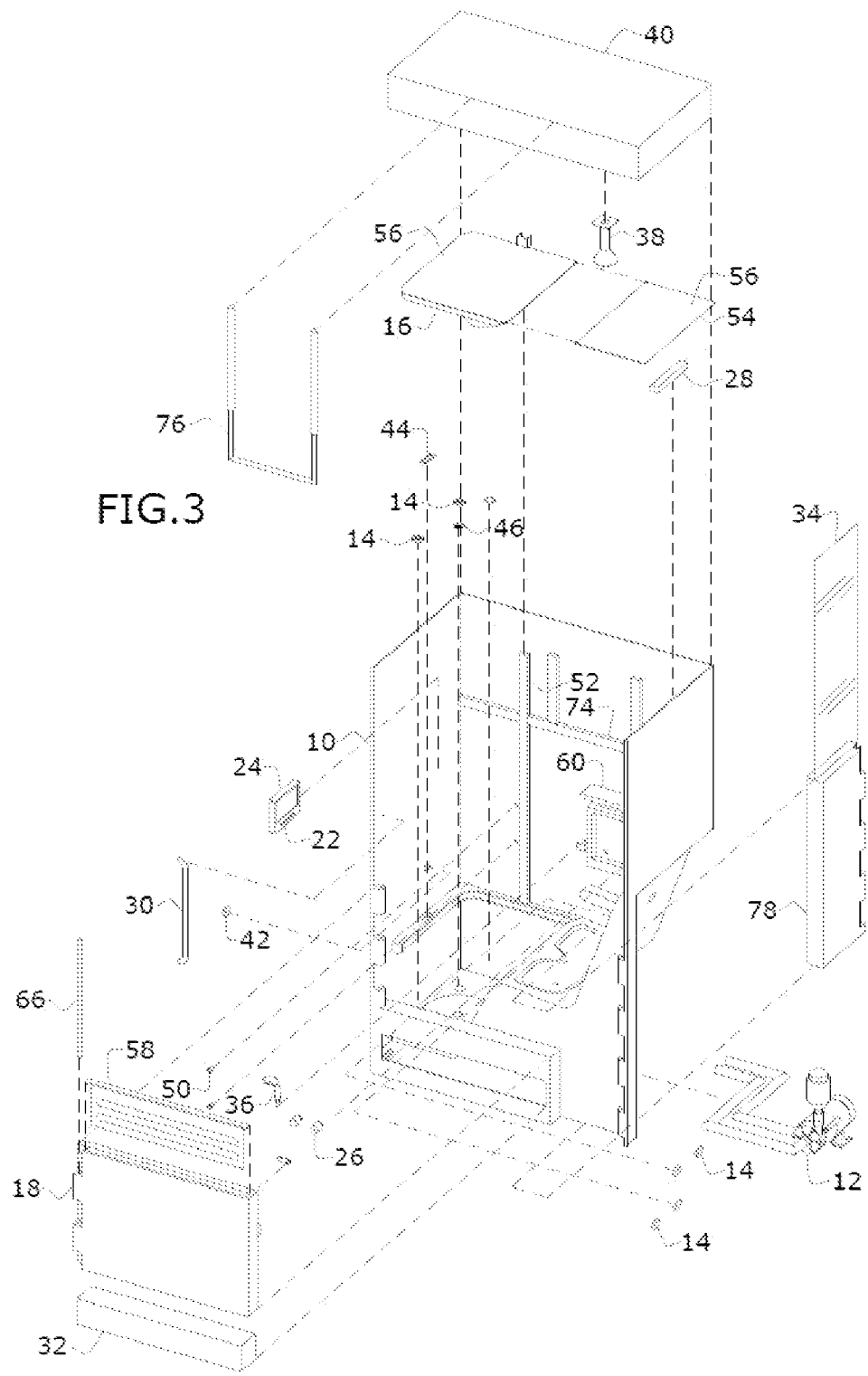
FIG. 3: is an exploded view of the invention

Reference to FIG. 3 illustrates an exploded view of the invention. When the upright massage tub is converted to a standard shaped bathtub for bathing children and/or pets, the adjustable hub top that unfolds to become leveling seat cover 54 will have the anti-slip surface 56, to help children and pets with their footing. The heated air jet motor 12 (housed under the tub seat) pressurizes water and air thusly pumping water and air through the tubs strategically placed water jets 14. The door hinge rod 66 allows the door to hinge between an open or closed position. Below the door, the step 32 allows users to enter and exit the tub safely and efficiently.

Figure 4:
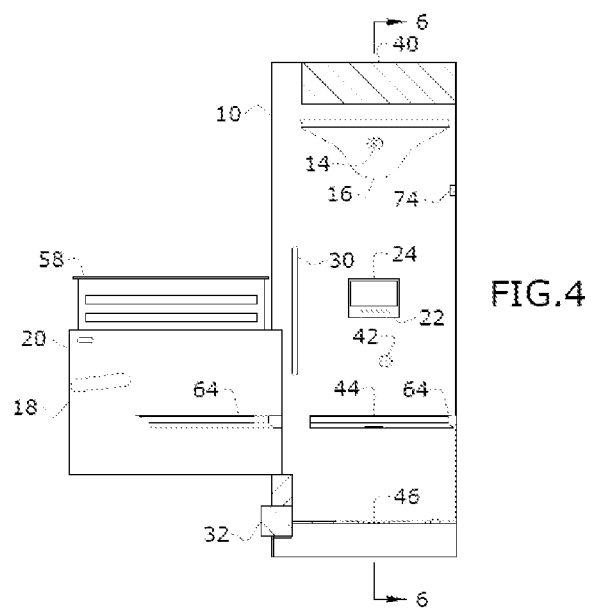
FIG. 4: is a section view of the invention taken along line 4-4 from FIG. 2
FIG. 5: is a section view of the invention taken along line 5-5 from FIG. 2
FIG. 6: is a section view of the invention taken along line 6-6 from FIG. 4
FIG. 7: is an enlarged detail view of the seal

Reference to FIG. 4 illustrates a left side view of the tub, from a perspective opposite the seat. The safety screen 58, shown in the "up" position coming from within and rising above the top of the open door, protects children and/or pets from falling out of the tub. At a height above the top of the tub, and above the top of the water's height potential, is the control panel 24 for user display and/or functioning apparatus controls. Under the control panel are the adjustment dials 22 which are used to select optimal pressurized water and air flow to desired water jet(s) 14 destination.

Figure 5:
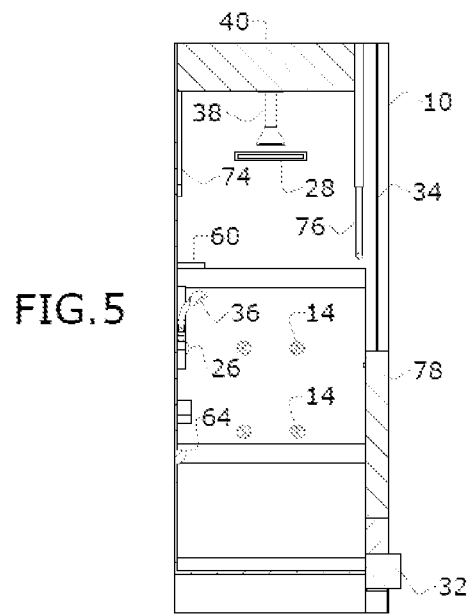

Reference to FIG. 5 illustrates a view of the invention tub seat from the opposite left side tub wall. The faucet 28 allows the tub to be filled via regular hot and cold water lines/controls.

Figure 6:
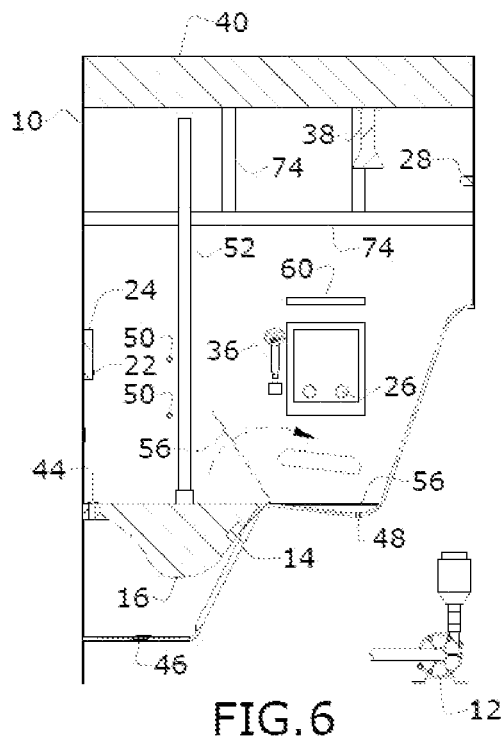

Reference to FIG. 6 illustrates a variation of the tub's frontal aspect. On the back wall is the shelf 60 for the placement of useful items. Below the shelf are the water valve knobs 26 for controlling hot and cold water flow to the faucet 28 shown in FIG. 5.

Above the water valve knobs 26 is the hand-held shower head 36 for rinsing as needed. Left proxy to the vertical hub/plug support guide 52 (shown in FIG. 2) are the air jet water ports 50 that direct pressurized water and air flow to the height adjustable hub/plug 16 (shown in FIG. 2). At gravity's low point of the seat are the seat drain holes 48 that drain water from the seat to the lower compartment (leg area) of the tub.

Figure 7:
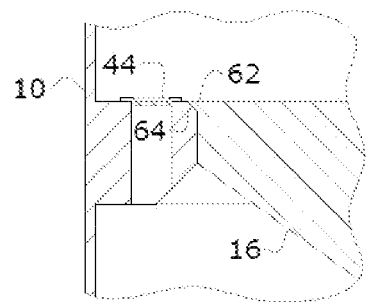

Reference to FIG. 7 illustrates the sealing lip 62 of the height adjustable hub/plug 16 while the height adjustable hub/plug 16 is lowered into its lowest vertical position for converting the tub from an upright massage tub into a standard shaped bathtub for bathing children and/or pets. Hereinto the sealing lip 62 of the height adjustable hub/plug 16 seals with the tub's sealing ledge 64 (shown in FIG. 1), creating a water-seal between the upper and lower sections of the tub.

Figure 8:
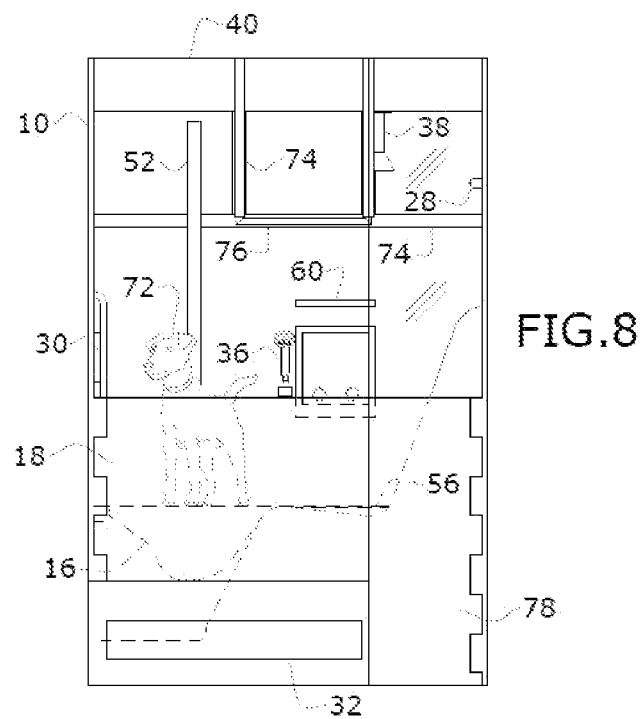
FIG. 8: is a front view of the invention shown in-use

Reference to FIG. 8 illustrates the tub as it would be used for bathing children and/or pets. A stationary shower head 38 directs water for user showering and/or user head and upper-body massage. The canine 72 provides visual reference as to the superior ergonomic position this UPRIGHT MASSAGE TUB THAT CONVERTS INTO A STANDARD BATHTUB invention provides people for bathing children and/or pets.

I claim:

1. An upright massage tub having a leg compartment and a built in seat comprising a hub that can be raised and lowered on a vertical rail, wherein the hub can be lowered to seal against the leg compartment and has a tub water jet for delivering water jet massage flow.

* * * * *